United States Patent [19]
Erickson

[11] Patent Number: 5,341,774
[45] Date of Patent: Aug. 30, 1994

[54] SELF SUPERCHARGED TWO STROKED CYCLE AND ENGINE HAVING MIGRATING COMBUSTION CHAMBERS

[76] Inventor: Frederick L. Erickson, 12108 Burning Tree Rd., Fort Wayne, Ind. 46845

[21] Appl. No.: 134,619

[22] Filed: Oct. 12, 1993

[51] Int. Cl.$^5$ .............................................. F02B 59/00
[52] U.S. Cl. ................................... 123/61 R; 123/68; 123/42
[58] Field of Search .................. 123/42, 45 R, 50 B, 123/61 R, 62, 61 V, 68, 294

[56] References Cited
U.S. PATENT DOCUMENTS

| | | | |
|---|---|---|---|
| 3,630,178 | 12/1971 | Erickson | 123/42 |
| 4,325,331 | 4/1982 | Erickson | 123/61 R |
| 4,437,437 | 3/1984 | Erickson | 123/61 R |

Primary Examiner—Tony M. Argenbright
Assistant Examiner—M. Macy
Attorney, Agent, or Firm—Roger M. Rickert

[57] ABSTRACT

Non-symmetrical port timing techniques in combination with the 90 degree phase difference between the pumping and combustion chamber of the two stroke migrating combustion chamber engine variant are disclosed as a special cycle of operation which allows a high degree of self supercharging and attendant performance advantages. Other embodiments include; protected fuel injection provisions, externally located induction rotor valves/counterweights to achieve better volumetric efficiency and complete dynamic balance and a technique to improve engine mechanism durability.

20 Claims, 9 Drawing Sheets

SELF SUPERCHARGED TWO STROKED CYCLE AND ENGINE HAVING MIGRATING COMBUSTION CHAMBERS

BACKGROUND OF THE INVENTION

The present invention relates to internal combustion engines and specifically to an internal combustion engine having a migrating combustion chamber (MCC). More particularly, this invention describes a special cycle and specific features which allow the MCC engine to operate on this cycle as a self supercharged two stroke cycle engine. This cycle will be disclosed including a detailed description of the timed events between the interrelated chambers required to obtain superior performance in terms of power to weight ratio, fuel efficiency and low emissions over its full load range.

The present invention utilizes the basic two stroke cycle mode of operation as taught in the original MCC engine U.S. Pat. No. 3,630,178. In this early patent, a rudimentary self supercharged MCC engine was disclosed. The engine of the present invention incorporates several significant improvements and a more clearly defined cycle of operation to improve its simplicity of operations and improve performance. Since this initial patent was issued, other variants of operation have been incorporated and patented. These variants are described in U.S. Pat. Nos. 4,325,331 and 4,437,437 which teach how the engine operates in a full expansion mode. These patents teach that if the hot, high pressure combustion gases are expanded down to and below atmospheric pressure, the exhaust will be very quiet and cool, and the over expansion process will help reduce the exhaust emissions. Recent data has shown that the emissions from these engines is significantly better than the current two stroke engines which power the small hand held devices such as; weed cutters, blowers and chain saws. However recent emission requirements being mandated by CARB (California Air Resources Board) and the EPA have practically eliminated the possibility of the small two stroke continuing to be used for these applications in its present form.

Accordingly, the present invention describes an advanced supercharged MCC two stroke variant of the original MCC engine patent. This engine possesses superior performance in terms of higher power to weight ratio, low emissions and excellent fuel economy due to several features as disclosed in this invention. These features are addressed as follows.

Non-symmetrical port timing is provided to allow the pumping (supercharging) chamber to achieve a very high volumetric efficiency. Supercharging of the primary combustion chamber is made possible by the 90 degree phase of the pumping chamber and non-symmetrical porting relative to the combustion chamber. These features in combination with precise port timing will provide superior scavenging control to achieve very low emissions. Also, since this engine utilizes a significant boost pressure and limited expansion it will possess a hot exhaust, appropriate for operating a compact catalytic converter. Further, the supercharging feature will decrease the effective friction and surface to volume ratio. Both of these improvements will increase the thermal efficiency. Additional embodiments of this invention utilize a rotary valve in the crankshaft eccentric to provide non-symmetrical timing required for high volumetric efficiency. Other embodiments include non-symmetrical porting arrangement utilizing a separate rotary valve for each pumping chamber, complete dynamic balance provisions and protected fuel injection provisions for even lower emissions capability. Finally, a feature incorporated as an improvement to the mechanism will contribute to longer mechanical longevity. This embodiment uses a sliding support for the center of the combustion chamber member (CCM) which is located between the center of the CCM and the center of the front or rear power blocks. This feature will eliminate all sliding contact between the CCM and center power block. The object is to negate all sliding contact between the two hot surfaces of the inside center power block and the end of the CCM which are directly exposed to the hot combustion. This feature will also simplify the lubrication requirement of the engine.

The small two stroke engines used on hand held tools such as weed cutters, leaf blowers and chain saws are under heavy attack by environmental agencies such as the EPA and CARB due to their enormous exhaust emissions. The primary problem is the ejection of up to 30 percent of the fuel (hydrocarbons) directly out the exhaust port. The impact of this is so serious that some companies are adapting the much cleaner but more expensive four stroke engines to these hand tools in an attempt to comply with the newer clean air regulations. Although the four stroke engine will come much closer to satisfying the emission regulations, the substitution of the four stroke engine will add a significant burden on the operator in terms of a larger, heavier unit. A further disadvantage will be the additional shaking forces associated with the less frequent but stronger power impulses of the four stroke engine to achieve the same power level.

More recent adaptation of the two stroke engine for automobile applications utilize some form of direct fuel injection into the combustion chamber after the exhaust port has closed to keep the fuel from being lost out of the exhaust port as occurs with the two stroke used on the hand tools. Unfortunately, complexity and cost keep the direct injection technique from being implemented into the small two strokes to reduce their emissions to acceptable levels. Even for automotive applications in which add on catalytic converters are required to control emissions, the fuel injected two strokes are still having trouble obtaining the very low emission levels under all load conditions required by the future standards for the automotive applications. Thus, the age old simple two stroke has received a number of complex refinements, too expensive for small applications and quite possible not quite good enough to qualify it as an ultra clean engine for future automotive use.

The MCC engine of the present invention features a supercharged mode of operation utilizing a boost pressure and precisely timed exhaust closing to dramatically enhance its ability to achieve lower emissions over its entire load range resulting in a higher power to weight and size ratio than the fuel injected two stroke.

It is therefore a primary object of this invention to provide a supercharging mode of operation in which fuel injection is not required to achieve the lower emissions standards for small engine application.

Another object of this invention is to obtain superior and complete scavenging of the exhaust products with the added benefit of producing additional pressure from the supercharging to counteract the back pressure of the catalytic converter in expelling the residual exhaust gases out of the combustion chamber and through the converter.

Yet another object of this invention is to improve the volumetric efficiency of this engine by incorporating a rotary valve. A rotary valve will provide non-symmetrical timing of the mixture into the pumping chamber so that a precise opening and closing angle can be selected to achieve the best possible filling of the chamber. A second method of induction timing utilizes two externally driven rotary valves, one for each pumping chamber, to provide even better volumetric efficiency and concurrently to incorporate a means to achieve complete dynamic balance with externally mounted counter weights.

A further object of this invention is to provide a higher thermal efficiency and lower Brake Specific Fuel Consumption (BSFC) due to this advanced cycle of operation. Supercharging results in a smaller engine relative to the standard two stroke engine for the same power output. This results in achieving a lower effective mechanism friction and also a lower effective surface to volume ratio due to the smaller physical size of the engine.

A further object of this invention is to achieve a simpler method of fuel injection after exhaust port closing. This method is incorporated to achieve the ultra low emission levels required for automotive and larger engine applications. A method of protecting the injection hardware from the high combustion temperatures and pressures will also be disclosed in which the engine utilizes the movement of the MCC engine mechanism itself to protect the injection hardware during the combustion and expansion segment of the cycle.

Yet a further objective is the incorporation of an improvement to the mechanism to improve durability and simplify lubrication requirements.

This invention accordingly utilizes the supercharged two stroke variant of the MCC mechanism as initially described in U.S. Pat. No. 3,630,178 as a basis for providing several important improvements developed for the engine which significantly improves its simplicity and performance. It has been found that non-symmetrical timing for interchamber and functional relationships is required to achieve the high performance levels of the currently described invention. Two specific examples of improvements in this regard are the exhaust blow down angle versus its closing angle and the start of induction of mixture into the pumping chamber versus its closing angle. In contrast to the non-symmetrical port timing now found to be desirable, the initial MCC patent provided near symmetrical timing events for both the exhaust and induction functions timing diagrams. This updated cycle of operation which utilizes the non-symmetrical timing for achieving an advanced self supercharged MCC engine will be described in detail.

A first significant improvement is the incorporation of the non-symmetrical port timing for the admission of the fuel mixture into the pumping chamber. It was found that a simple rotor valve located in the eccentric of the crankshaft provided this degree of control. This non-symmetrical feature allows longer admission of the mixture into the pumping chamber past its bottom dead center (BDC) position than can be provided by the slide port arrangement as disclosed in U.S. Pat. No. 3,630,178. This feature yields a significant improvement in the volumetric efficiency of the pumping chamber and consequently increases the degree of supercharging available resulting in higher power and efficiency and lower emissions. The non-symmetrical porting feature also allows the start of induction to be delayed past top dead center (TDC which is the position of minimum chamber volume) to a point in which the pumping chamber pressure is less than the induction manifold pressure to keep the left over high pressure mixture generated during the high pressure charging of the combustion chamber from blowing back into the induction manifold and consequently back through the carburetor.

A second aspect of this non-symmetrical feature is the incorporation of externally driven rotary valves directly into the center power block to add an even higher degree of performance in terms of further improved volumetric efficiency and also the means to achieve complete dynamic balance of the engine by the incorporation of counterweights to the rotor valve shafts. The dynamic balancing arrangement is similar to the one disclosed in U.S. Pat. No. 4,437,437 FIGS. 59 through 63.

The overall effect of the higher degree of supercharging is to reduce the engine's physical size compared to a crankcase scavenged two stroke engine of the same power. The smaller physical size results in lower equivalent mechanism friction and a smaller equivalent surface to volume ratio.

The standard crankcase scavenged two stroke engine does not offer the self supercharging feature of the MCC engine since it can not continue to pump the fuel mixture into the combustion chamber after the exhaust port closes. It can only displace a volume of mixture approximately equal to the combustion chamber volume above the exhaust ports. The MCC engine's ability to continue pumping mixture into the combustion chamber after the exhaust port closes qualifies it as a true supercharged variant of the MCC engine. The present invention in which non-symmetrical port timing controls the admission of mixture into the pumping chamber to enhance its volumetric efficiency is a significant addition to further enhance the performance of the MCC two stroke engine. The nomenclature assigned to the supercharged variant of the MCC engine is pressurized induction, single expansion or PISE.

A third aspect of the present invention to further improve its fuel economy and reduced its exhaust emissions is the provision of a method to inject fuel into the combustion chamber after the exhaust port closes. Such a provision consists of an injector located in the center power block, in which after injection is completed, is covered by the movement of the CCM to protect it from exposure to the very hot combustion gases. Taking advantage of the normal movement of the CCM by having it cover the fuel dispensing nozzle during the hot, high pressure portion of its movement will simplify the injection hardware since it will not be exposed to the direct high pressure and temperature of combustion.

Yet a fourth aspect of this invention is disclosed to improve durability by incorporating a center slide for the CCM. This feature represents a major improvement in the mechanics of the MCC engine and allows simpler lubrication provisions required for sustained high speed operation.

Accordingly the intent of this invention is to describe a special cycle of operation which can be achieved by a self supercharged MCC two stroke engine. Also, key features will be described which make it possible for this engine to operate on this cycle and to achieve a high degree of performance.

DESCRIPTION OF THE PREFERRED EMBODIMENTS

Figure 1:
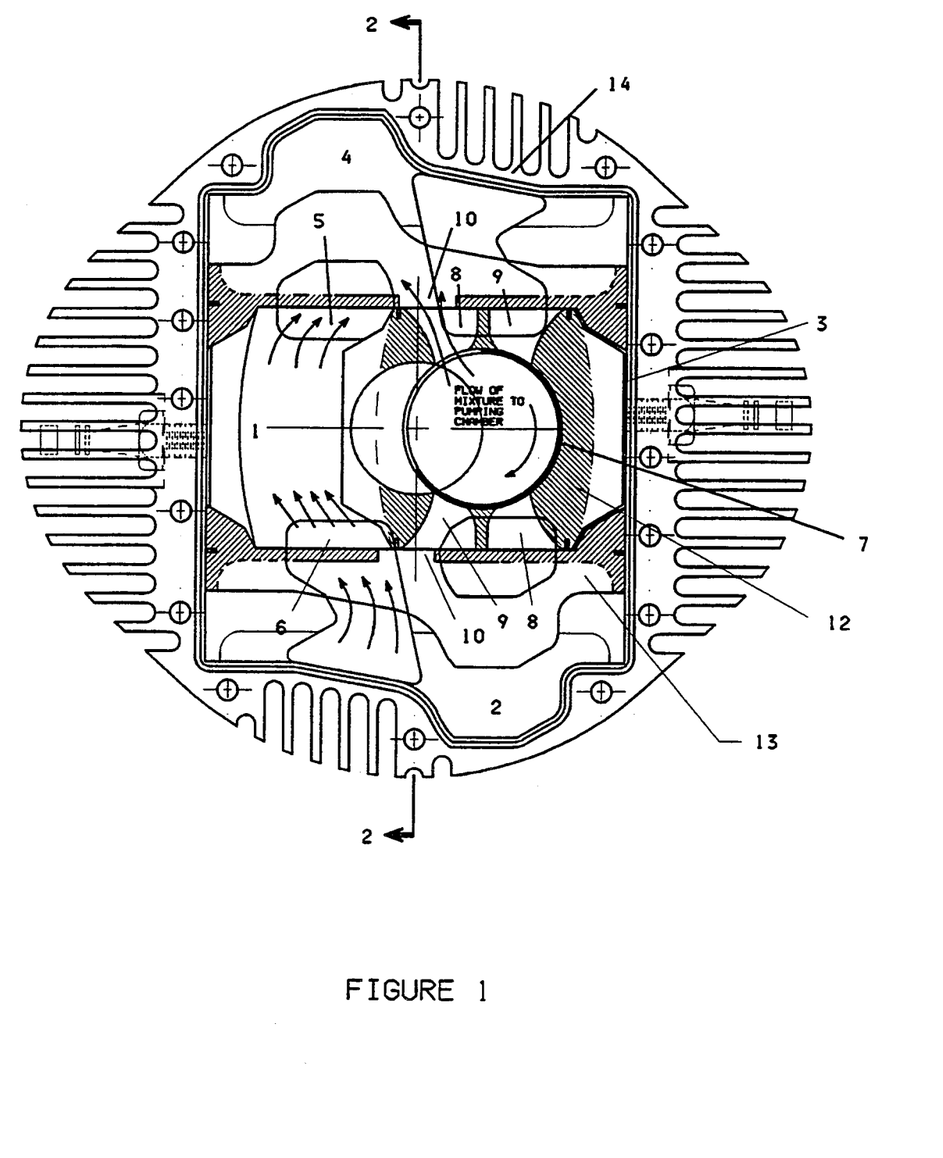
FIG. 1 is a internal section view of the mechanism of this invention.
Figure 2:
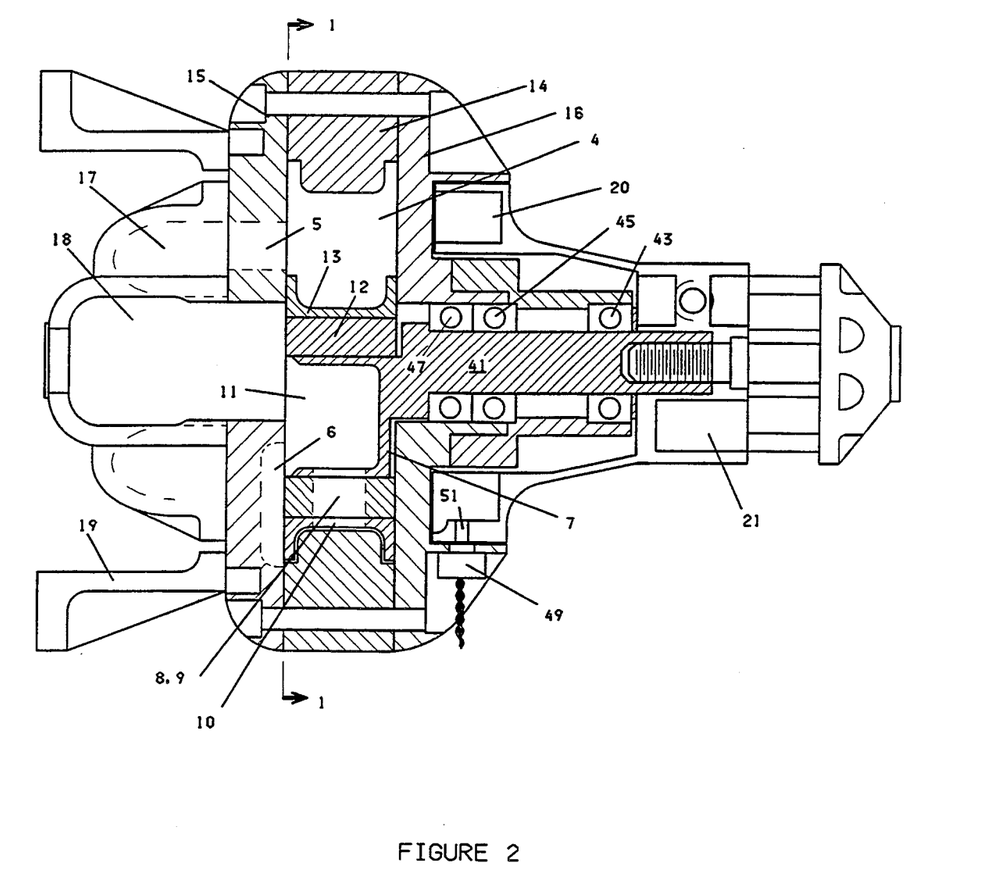
FIG. 2 is a longitudinal section view of an overhung crankshaft version of the MCC mechanism.

In FIGS. 1 and 2 there is shown a self supercharged two stroke cycle internal combustion engine having a stationary power block housing formed of a block 14 and a pair of heads 15 and 16, a combustion chamber member 13, a working piston 12, a crankshaft 7, and bearings 43, 45 and 47 which rotatably support said crankshaft.

As in my prior U.S. Pat. No. 3,630,178, as the crankshaft 41 rotates, the combustion chamber member 13 executes a vertical reciprocating motion as viewed in FIG. 1 while the working piston 12 executes a horizontal reciprocating motion relative to the combustion chamber member 13. The combined effect of these motions results in a circular motion of the working piston 12 with the eccentric portion 7 of the crankshaft about the center line of the crankshaft 41. Thus, the combustion chambers 1 and 3 experience not only a change in size, but a change in location as well. The chambers 1 and 3 migrate. The working (orbiting) piston 12 acts as the primary power piston for the crankshaft 41 and is connected thereto through a rotary bearing. The working piston 12 is driven directly by the alternating combustion forces applied to opposite faces of the piston from the pair of combustion chambers 1 and 3 located on opposite sides of the piston. The combustion chambers are located within the combustion chamber member (CCM) 13 and bounded by heads (also referred to as power blocks) 15 and 16 on opposite ends. While the migrating combustion chambers are located within the CCM, there are also fixed location, variable volume pumping chambers 2 and 4 formed outside the CCM which may be utilized to provide fresh air, or a fuel/air mixture to the combustion chambers. The crankshaft supports a magnet 51 which energizes a sensor 49 each time it passes to provide basic engine ignition and/or fuel injector timing.

Figure 3:
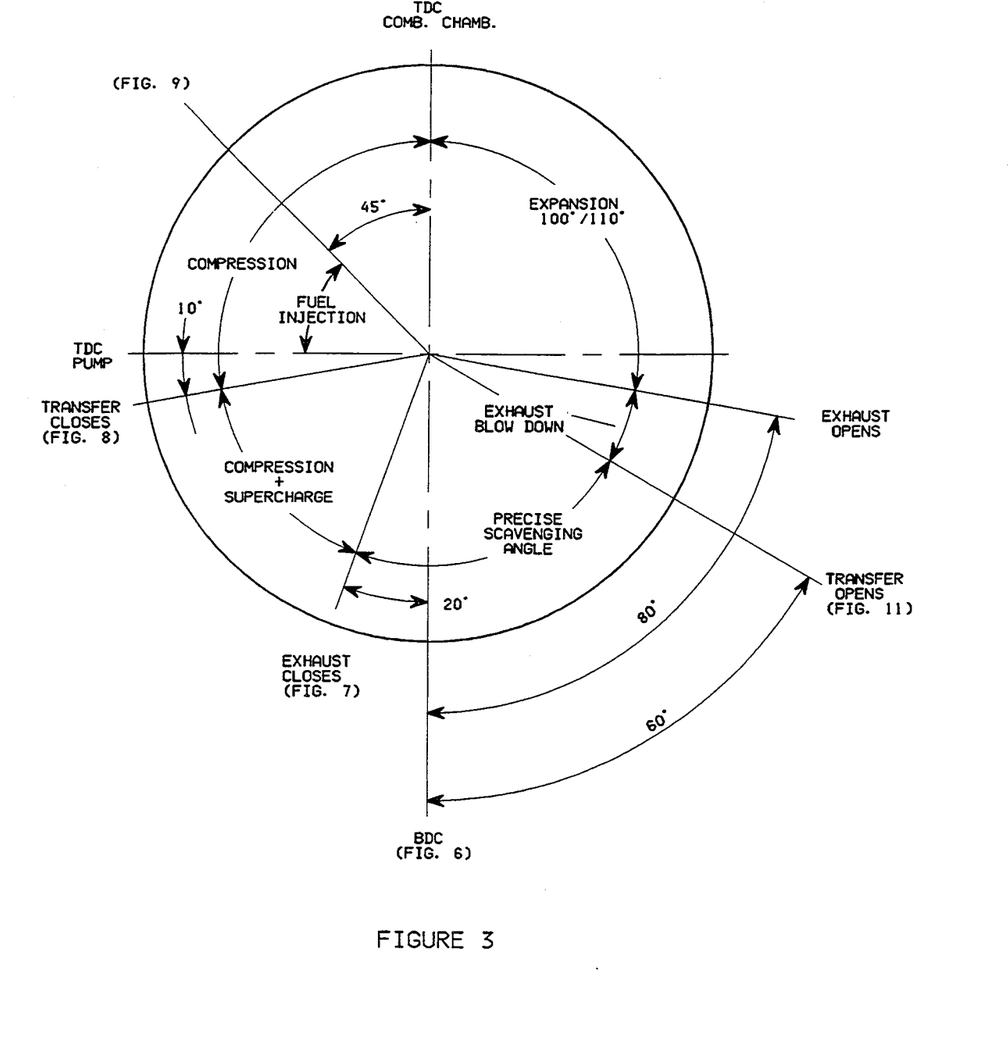
FIG. 3 illustrates the timing diagram of the events associated with the self supercharged MCC two stroke cycle engine of this invention.
Figure 5:
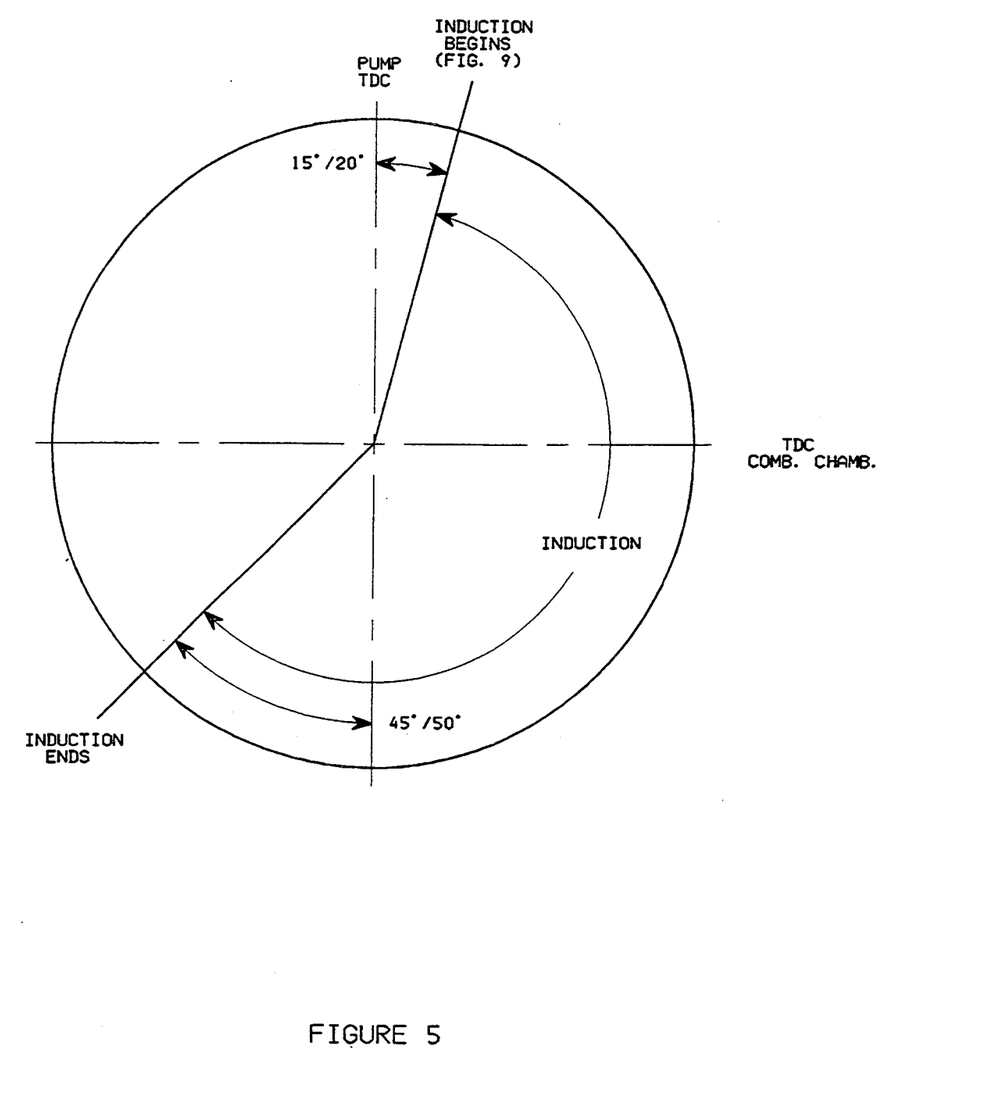
FIG. 5 illustrates the timing diagram of the non-symmetrical timed valving for induction utilized in the engine of this invention.
Figure 14:
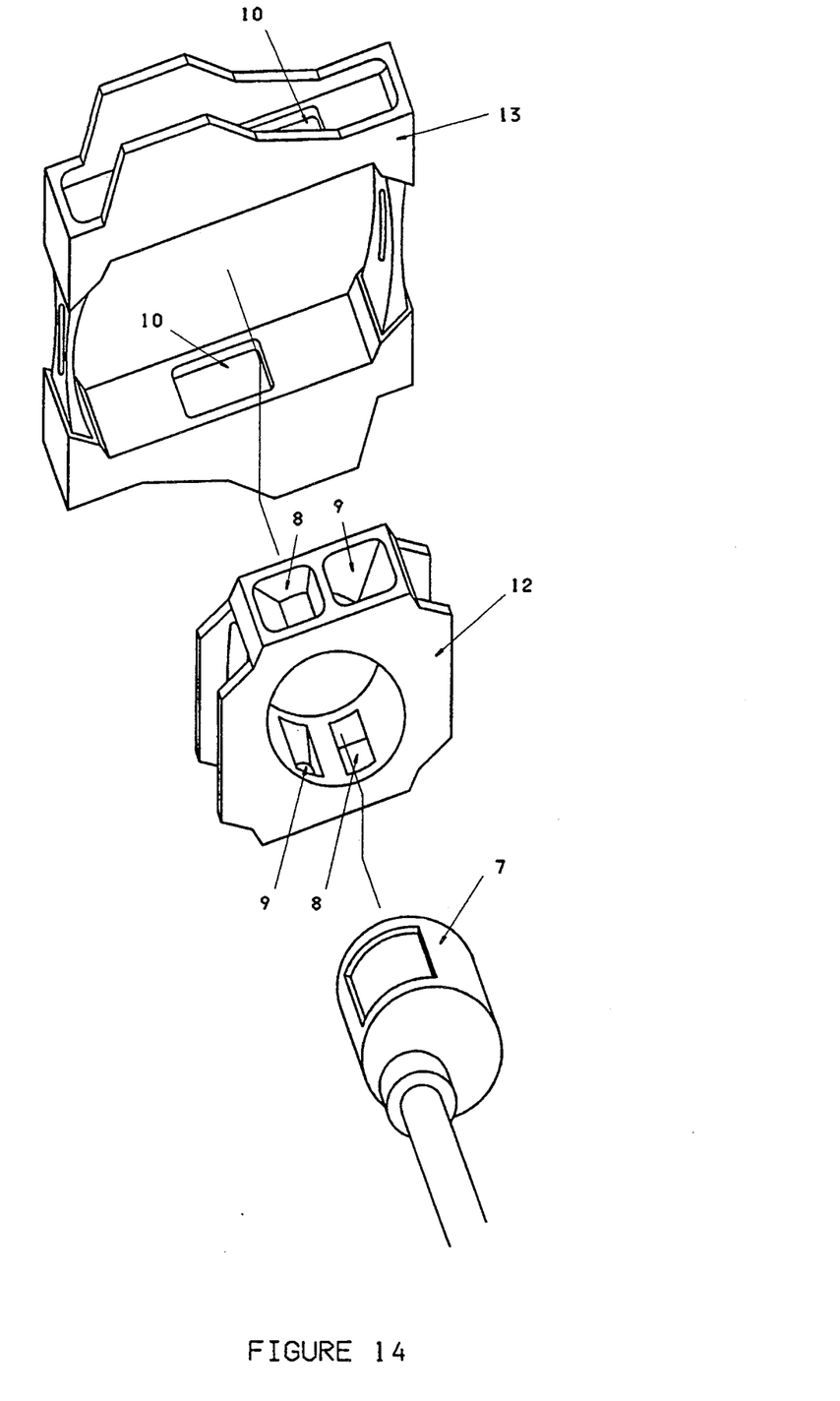
FIG. 14 is an exploded perspective view illustrating the combustion chamber member, piston and crankshaft cooperation to provide valving.

The present invention encompasses an advanced operational cycle for the self supercharged MCC two stroke engine in which the internal mechanism is illustrated in FIG. 1 and FIG. 2. The timing diagram of the events associated with this cycle are illustrated in FIGS. 3 and 5. Other important features which make this cycle possible are addressed in the other referenced FIGS. 6–11. Also, FIG. 14 illustrates the part locations for the three moving parts and clarifies how these parts work together. The rear internal view of an air cooled version of the MCC engine of FIG. 1 illustrates the mechanical features, ports and form factor of this mechanism. Note the very large ports (5 and 6) which serve the combustion chamber 1. These ports provide the non-symmetrical scavenging and charging capability of this mechanism as the combustion chamber migrates back and forth between the transfer port 6 and exhaust port 5. FIG. 1 also illustrates that pumping chamber 2 serves combustion chamber 1 and pumping chamber 4 serves combustion chamber 3. This arrangement results in two power impulses per revolution utilizing three moving parts, which are the orbiting piston OP 12 combustion chamber member (CCM) 13 and the combination crankshaft and eccentric rotary valve 7. The flow of mixture for either air or a fuel/air combination enters the center of OP 12 from a passageway 11 in the center of the rear power block and is then alternately valved into the two pumping chambers 2 and 4. FIG. 1 illustrates that with the CCM 13 traveling downward the mixture is being drawn into pumping chamber 4 through the sequenced OP ports 8 and 9 and the CCM port 10. Also, FIG. 1 illustrates that pumping chamber 2 is now delivering its mixture into combustion chamber 1 by way of the transfer port 6. Note that combustion chamber 1 is in its scavenging mode in which the exhaust gases are exiting the engine through exhaust port 5 by the forced passage of the mixture through the combustion chamber by pumping chamber 2. This scavenging process is referred to as uniflow or one direction in which the least chance of mixture and exhaust gas mixing is widely accepted as the best method to achieve purging of the exhaust gas from a two stroke cycle engine cylinder.

FIG. 2 illustrates a longitudinal section view showing an overhung crankshaft version of the mechanism. This view further illustrates that the internal moving parts i.e., OP 12, and the CCM 13 operate inside the center power block 14 and between the rear power block 15 and front power block 16. The overhung crankshaft 7 with its output shaft 41 and rotary valve utilizes a counter weight 20 which is 180 degrees out of phase with the mechanism and a smaller counter weight 21 which is in phase with the mechanism to provide a simple but effective method of achieving excellent balance. The crankshaft is supported by bearings 43, 45 and 47. The induction manifold 18 delivers the mixture to the center passage way 11 from a carburetor or source of mixture. The exhaust manifold 17 receives the exhaust gas from the exhaust port 5 (FIG. 1) and channels it to the exhaust system. Other features illustrated in FIG. 2 include an ignition or fuel injection sensor denoted by a magnet 51 and hall sensor 49.

Figure 6:
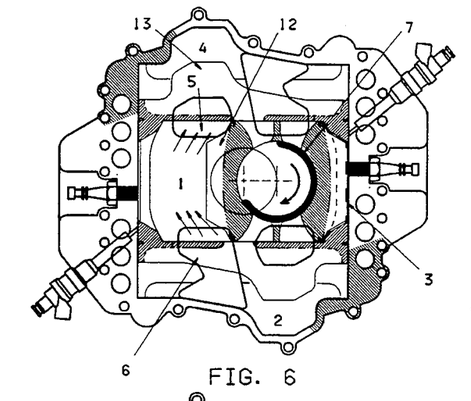
FIGS. 6–11 show a series of mechanism position diagrams used to describe the special cycle of operation for the engine of this invention.

The special cycle of operation which makes self supercharging of the MCC engine possible is illustrated as a water cooled version of the engine in FIGS. 6 through 11 by a series of mechanism position diagrams. An operational description of the specific events which must occur to accomplish this cycle is now given in reference to FIGS. 6 through 11. Also refer to FIG. 3 as a reference to the angular relationships. FIG. 6 illustrates the mechanism as the left combustion chamber 1 has reached its bottom dead center (BDC which is the position of maximum chamber volume) position and is nearing the end of exhaust scavenging function as the CCM is traveling downward while pumping a mixture from the lower pumping chamber 2 up through the transfer port 6 into combustion chamber 1. The mixture is traveling upward through the combustion chamber 1 in one direction as it purges the exhaust gases out through the upper open exhaust port 5. This method of purging is called uniflow scavenging.

Figure 7:
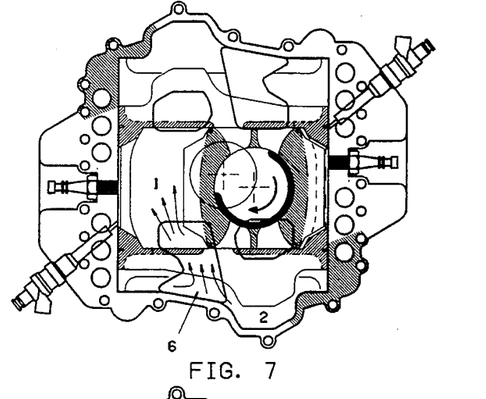
Figure 8:
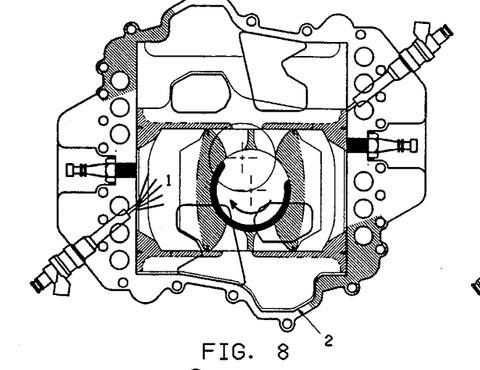
Figure 9:
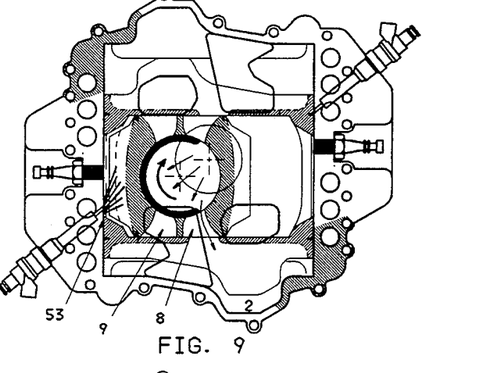
Figure 10:
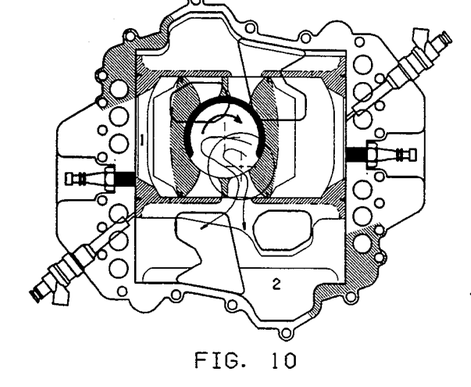
Figure 11:
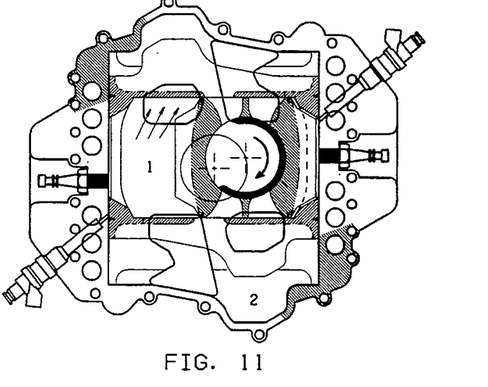

By the time the exhaust port 5 is closed by the downward movement of the combustion chamber member as shown in FIG. 7, a precise volume of scavenging mixture from chamber 2 has purged the combustion chamber 1 of the exhaust Gases. Note that due to the non-symmetrical port timing (provided by the precise timing of the exhaust and transfer ports) the exhaust port can be close, at the exact point at which the scavenging mixture has filled the combustion chamber with little loss of additional fuel out the exhaust port. Note also that this complete scavenging as illustrated in FIG. 7 (and FIG. 3) is achieved with the combustion chamber still at close to its full displacement volume or only 20 degrees past BDC. Further note that at this point the transfer port 6 is still wide open and chamber 2 still has more than one half the total combustion chamber volume still being pumped into the combustion chamber 1. This continued charging of the combustion chamber, after the exhaust port has closed, provides the self supercharging capability which the normal crankcase scavenged two stroke engine with symmetrical port timing simply does not have. FIG. 8 shows that the quantity of charging air still left in chamber 2 has been pumped into the combustion chamber 1 to provide a highly dense mixture with an equivalent volume of up to 1.5 times the maximum geometrical volume of the combustion chamber. Note in FIG. 8 that the transfer port closed about 10 degrees before the pumping chamber reaches its TDC position. This is required in order to maximize the amount of mixture which is transferred to the combustion chamber due to some clearance volume left in the pumping chamber. As the transfer port closes in FIG. 8, the final stage of compression of the mixture is continuing in the combustion chamber. FIG. 9 illustrates that if fuel injection is incorporated into the combustion chamber head, the injection of this fuel can begin right after the transfer port closes. By the time the orbiting piston has reached a position about 45 degrees before top dead center (BTDC) as illustrated in FIGS. 9 and 3 the fuel injection is complete. Also, note in FIG. 9 that the fuel injector will be mechanically covered by the edge 53 of combustion chamber member 13 as the combustion chamber member travels upward. This feature protects the injector from the heat and pressure of combustion by the moving CCM. This feature assures that the open injector is protected from the hot, high pressure conditions of the combustion process. Direct injection as used in the standard piston engine is exposed to the hot, high pressure gases and carbon contamination and must be designed to withstand these conditions. FIGS. 10 and 3 illustrate that the exhaust port is nearing the point at which it will be opened by the orbiting piston at about 80 degrees before bottom dead center (BBDC) and will continue to approximately 60 degrees BBDC at which point the transfer port will open to begin the scavenging process as shown in FIG. 11. It is very important to allow the start of exhaust blow down to begin early enough to assure an exhaust port opening area large enough to permit rapid blow down followed by the very quick scavenging process to take place. This is again accomplished by the non-symmetrical exhaust timing in which exhaust opening is accomplished with the piston a little past the half way point in its power stroke and closing is accomplished by the combustion chamber member with the piston a short distance past its BDC position. The ability to open the exhaust port with one member and close it with the other member facilitates the non-symmetrical timing. The closing is selected at the precise point at which the scavenging process is completed. FIG. 6 again illustrates that scavenging and combustion chamber charging is again underway which initiates the start of a new cycle. It should be noted that the events described for chambers 1 and 2 also occur in chambers 3 and 4 except they occur 180 degrees out of phase.

The induction of the mixture into the pumping chamber 2 is provided by the non-symmetrical timed rotary valve when it begins to open to begin induction in FIGS. 9 and 5 (when the high pressure in chamber 2 has been reduced to the induction manifold pressure). Notice, the valve opens rapidly as it uncovers the piston port 8 and 9 as pumping chamber 2 is increasing in volume. This allows the rear induction port 11 in the center of the rear power block to provide a direct route to the carburetor or mixture source. The mixture then travels from a carburetor or throttle body to the pumping chamber 2 by way of the open rotary valve. As pumping chamber 2 is nearing its full volume condition as shown in FIG. 10 the rotary valve is fully open to allow maximum breathing of the mixture into pumping chamber 2 under open throttle conditions. By the time the rotary valve rotates to an angle of approximately 45/50 degrees after bottom dead center (ABDC) as shown in FIG. 5 (which occurs a short time before FIG. 11) the valve closes and the induction of the mixture into chamber 2 has been completed. FIG. 11 shows that the air which was inducted into chamber 2 is now being compressed and just starting to be pumped into combustion chamber 1. This compression continues through FIGS. 6 through 8 to complete the charging of the combustion chamber.

FIG. 8 illustrates that as soon as the bypass port is closed, the fuel can be injected into the combustion chamber, This is accomplished so that none of the fuel droplets will enter the bypass ports and settle (for example) on the walls of point 6 during the time that near quiescent conditions may prevail (near the end of supercharging in which the transfer is nearly complete). This assures little possibility of the pure air charge used for scavenging will pick up any fuel and transport a small part of it out through the exhaust ports during the final scavenging process. FIG. 9 illustrates that the fuel injection is almost complete and the CCM edge 53 is close to covering the injector. FIG. 10 shows that the injector is now completely protected from the extreme heat and pressure during the combustion process by the CCM. This protection provision allows the use of more economical injectors since they are not required to be exposed to the extreme heat of combustion. Also, since the compression pressure during injection is somewhat less than 100 psi an operating system pressure of 125 psi will provide adequate injection pressure without requiring any special back flow check valve required in the delivery line. This provision will make the very desirable (direct injection) technique very practical to implement into the supercharged MCC engine of this invention.

This completes the basic description of this cycle. Further discussion will now elaborate on the important features covered in the cycle description of FIGS. 6 through 11 and how these features specifically enhance the operation of this engine.

Referring again to FIG. 1, a noteworthy improvement of this design is the large rotor valve 7 which is made an integral part of the crankshaft eccentric (or big end). This valve will supply a precisely timed charge of either air or a fuel and air mixture to the upper and lower pumping chambers 4 and 2 respectively. Notice also from FIG. 1 that the pumping chambers are phased at 90 degrees relative to the combustion chamber that each one serves and that the swept volume of each pumping chamber is over one and a half times the swept volume of each combustion chamber. This feature plus the non-symmetrical port timing of the induction and exhaust ports which serve the combustion chamber provides an overwhelming advantage over the conventional engine in terms of higher power due to its self supercharging feature, a very compact design and it also provides two power pulses per revolution with three moving parts.

Additional benefits of supercharging that may not be evident from FIG. 1 is that a smaller engine mechanism will result in lower equivalent mechanism friction. Also, since supercharging packs in an additional 50 percent of mixture into the MCC engine's combustion chamber than is possible with a conventional two stroke engine, the combustion chamber surface to volume ratio will be significantly smaller by 22 percent at TDC and 38 percent less at BDC. These advantages are derived because of the impossibility of a standard crankcase scavenged two stroke engine to self supercharge itself.

Again the reason the MCC engine can be supercharged and the standard crankcase scavenged two stroke engine can't is attributed to the non-symmetrical port timing of the combustion chamber and 90 degree phase difference between the pumping and combustion chambers of the MCC engine. The ability of the MCC engine to close off the exhaust port at a predetermined optimum scavenge point and then continue to pump the mixture into the combustion chamber even as the piston is compressing the mixture results in the significant boost pressure required to be classified as a true self supercharged two stroke engine. Where as the standard two stroke engine's pumping chamber (crankcase) is phased 180 degrees relative to the combustion chamber in which the major portion of the scavenging mixture is pumped into the combustion chamber long before the exhaust valve closes. This results in a significant loss of mixture out the exhaust port as the piston is closing the combustion chamber volume and actually pushing some of the mixture out as it closes this volume. Thus, the actual compression volume is much less than the maximum cylinder displacement where as the MCC engine's compression volume or (equivalent volume) is 1.5 times its maximum chamber displacement.

The objective of the rotary valve 7 illustrated in FIG. 1 is to provide a non-symmetrically timed port between the mixture source 11 and the pumping chambers 2 and 4. Previous MCC engines used a slide port between the orbiting piston OP 12 and the combustion chamber member CCM 13 which resulted in symmetrical timing. It was found through further development that a form of non-symmetrical port timing was required to achieve superior performance as discussed in the operational description. The following discussion will illustrate why the non-symmetrical port timing is better for the operation of the supercharged MCC two stroke engine over the symmetrical slide valve port timing taught in the original MCC U.S. Pat. No. 3,630,178.

Figure 4:
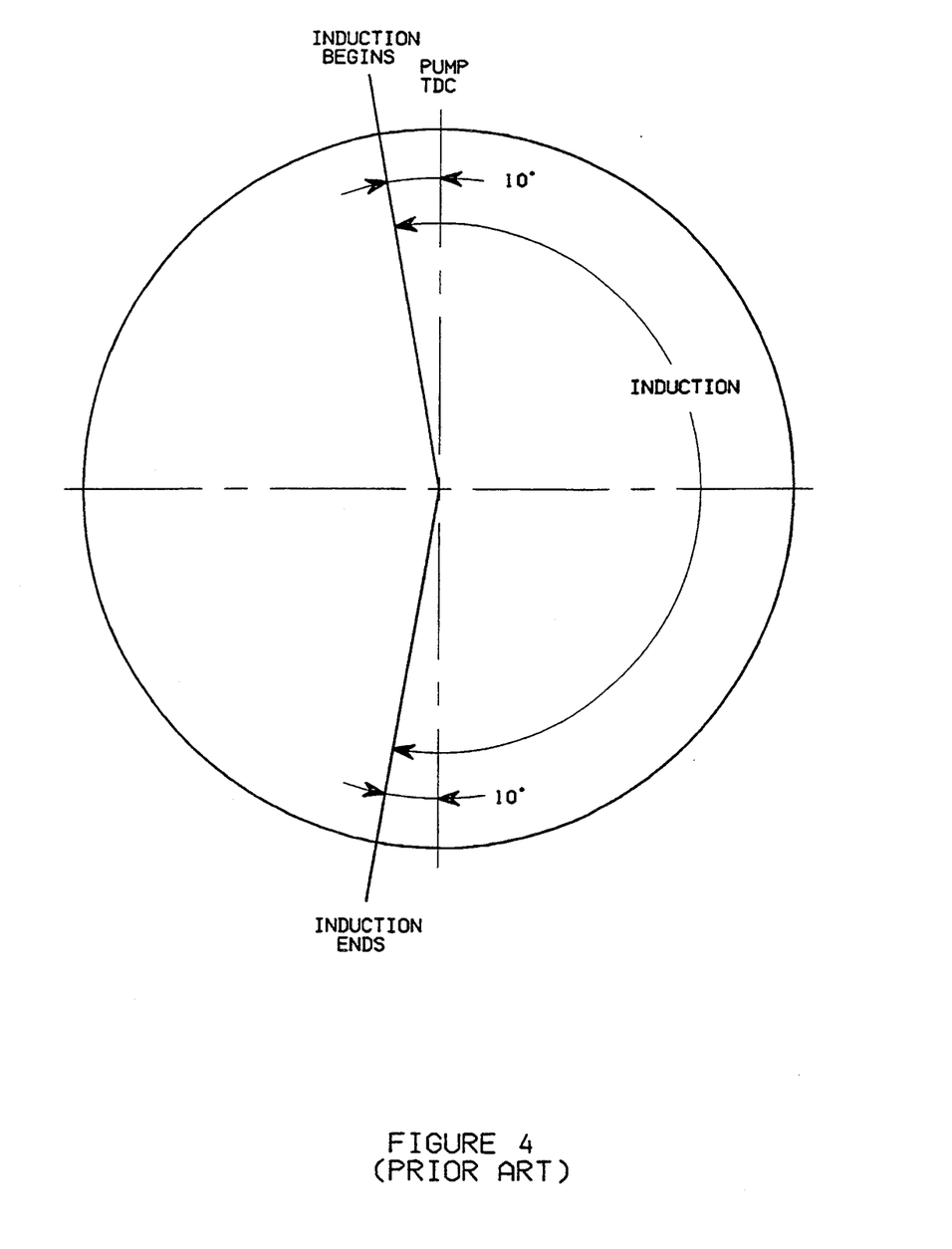
FIG. 4 illustrates the timing diagram of the symmetrically timed valving for induction described in U.S. Pat. No. 3,630,178.

Referring to FIG. 1, the mixture is pumped into the combustion chamber from the pumping chamber until the bypass port 6 is closed by the OP 12 (FIG. 8) to begin the start of final mixture compression. The timing of this event as illustrated in FIG. 3 represents the ideal port timing diagram for a supercharged two stroke MCC engine. Notice in FIG. 3 that the angle at which the bypass port closes is 10 degrees BTDC for the pumping chamber, which is also 100 degrees BTDC for the primary combustion chamber. Ideally, if the pumping chamber and side ports had a zero clearance volume, the bypass port could close right at TDC for the pumping chamber. However, it has been found that a slightly earlier closing is required in order to maximize the amount of mixture transfer to the combustion chamber due to some unavoidable clearance volume. Since this angle of 10 degrees BTDC for the pumping chamber is relatively fixed it will influence at what point the port opening time for the induction of the mixture into the pumping chamber should occur. FIGS. 4 and 5 illustrate why the non-symmetrical port timing using a rotary valve for the timing of the admission of the mixture into the pumping chamber is preferred over the symmetrical timing provided by sliding valves between the OP and CCM as taught in U.S. Pat. No. 3,830,178.

First, the timing diagram illustrated in FIG. 4 shows that the symmetrically timed slide valve will be required to open at the same angle BTDC as it closes ABDC. In this case since the transfer of mixture stops at 10 degrees BTDC (pump), according to FIG. 3, then the soonest that the port can open to begin the induction of the mixture into the pumping chamber is also 10 degrees BTDC (pump). If the opening timing is any sooner, the high pressure mixture being used to supercharge the combustion chamber will blow back into the induction manifold and back out through the carburetor. However, if 10 degrees BTDC (pump) is the limit then the angle for the closing of the port to stop mixture flow into the pumping chamber must also be 10 degrees ABDC (pump) due to the symmetrical timing requirements of the slide valve. The 10 degrees overlap is much too small to assure adequate filling and good volumetric efficiency for the pumping chamber. Therefore FIG. 5 illustrates that if non-symmetrical timing by using a rotary valve is utilized the appropriate overlap in the order of 45/50 degrees will assure that Good volumetric efficiency is achieved. Also, FIG. 5 further illustrates that the opening of the rotary valve can now be delayed past the pump TDC to a point in which the pressure of the residual mixture left in the clearance volume of the pumping chamber can be reduced to a point more equal to the pressure in the induction track to avoid an inevitable mixture blow back. Thus, it is illustrated that non-symmetrical timing is required to precisely select the opening and closing angle of the valve which controls the admission of the mixture into the pumping chamber.

Also referring to the timing diagram of FIG. 3 it is illustrated that exhaust opening and closing is also non-symmetrical. This timing is controlled by the OP as it opens the exhaust port and the CCM as it closes the exhaust port, Notice that the point at which the exhaust port opens to begin the exhaust blow down occurs at a much greater angle before BDC relative to the much smaller angle in which it closes after BDC. This non-symmetrical relationship is quite contrary to that taught in U.S. Pat. No. 3,630,178 which illustrates a symmetrical timing diagram for the exhaust opening and closing. It has been found that exhaust opening must begin early enough to assure rapid pressure decay and exhaust gas scavenging against the back pressure of a muffler or catalytic converter. It has also been found that early exhaust port closing is now appropriate due to the high scavenging pressure and high initial volume being pumped to provide ample scavenging and preliminary charging of the combustion chamber immediately after BDC. Note FIG. 3 illustrates that the exhaust port can be closed soon after BDC. This assures that most of the mixture left in the pumping chamber can be used to further charge the combustion chamber during the supercharging portion of this cycle.

Figure 12:
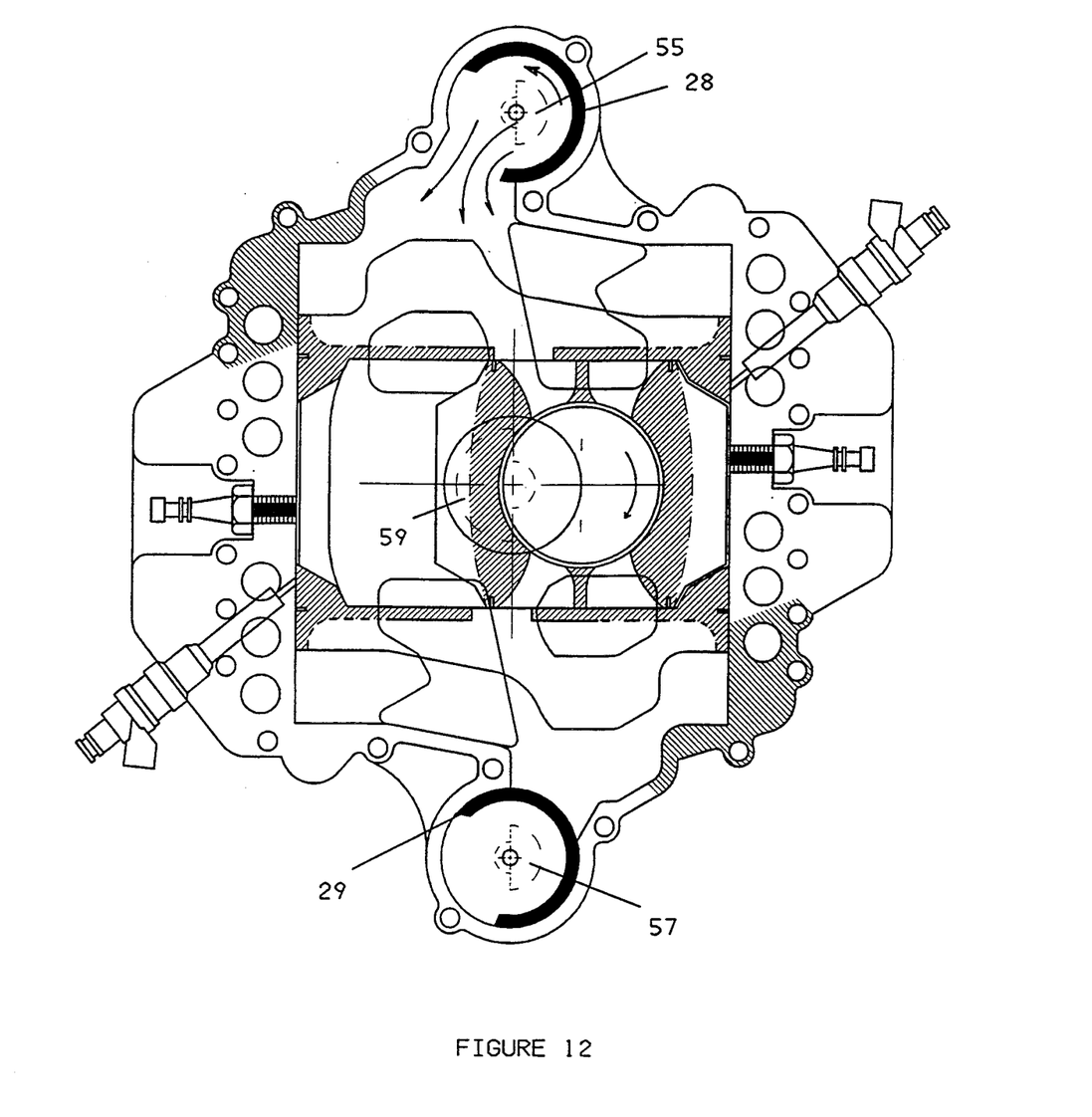
FIG. 12 illustrates a second method of obtaining non-symmetrical valve timed induction utilizing externally driven rotor valves.

A second embodiment to achieve non-symmetrical valving to fill the pumping chamber is hereby disclosed by referring to a water cooled version of the engine illustrated in FIG. 12. Notice that two rotary valves, 28 and 29, one for each pumping chamber can be utilized to control the filling of each pumping chamber. A means to rotate these valves in a direct one to one relationship to the engine's crankshaft such as a gear and timing belt is required in order to provide precise timing of each valve. The first major advantage of this twin valve configuration is that there is less clearance volume since the open volume in the OP ports 8 and 9 is eliminated. This feature will improve the volumetric efficiency of the pumping chamber and combustion chamber combination even more which will in turn enhance the power output. A second very important advantage is that counter weights can be attached to these outboard rotary shafts to provide perfect dynamic balance for the entire engine to achieve vibration free operation. Reference is now made to the MCC engine U.S. Pat. No. 4,437,437 which describes how complete dynamic balance can be achieved through the use of externally driven shafts with counter weights attached. FIGS. 59 through 63 of this patent show how two external counter weights can be phased with a counter weight on the main shaft to rotate in the opposite direction to achieve complete dynamic balance. The engine of the present invention can utilize the precise non-symmetrical timing of the separate rotary valves to achieve better volumetric efficiency and also add the smoothest possible operation with the attached counter weights with little additional complexity and cost, These additional counterweights are illustrated by phantom counterweights 55 and 57 in relation to the main counterweight 59 in FIG. 12.

A third embodiment of this invention to enhance fuel efficiency and reduce emissions includes the incorporation of direct fuel injection into the center power block in a location to serve each combustion chamber, The location of each injector is further allocated to a specific location in the power block as illustrated by injectors 61 and 63 in FIG. 12 in which the normal movement of the combustion chamber member will cover the injector during the ignition and combustion portion of the cycle as described in the preceding operational description of FIGS. 8 through 10.

Figure 13:
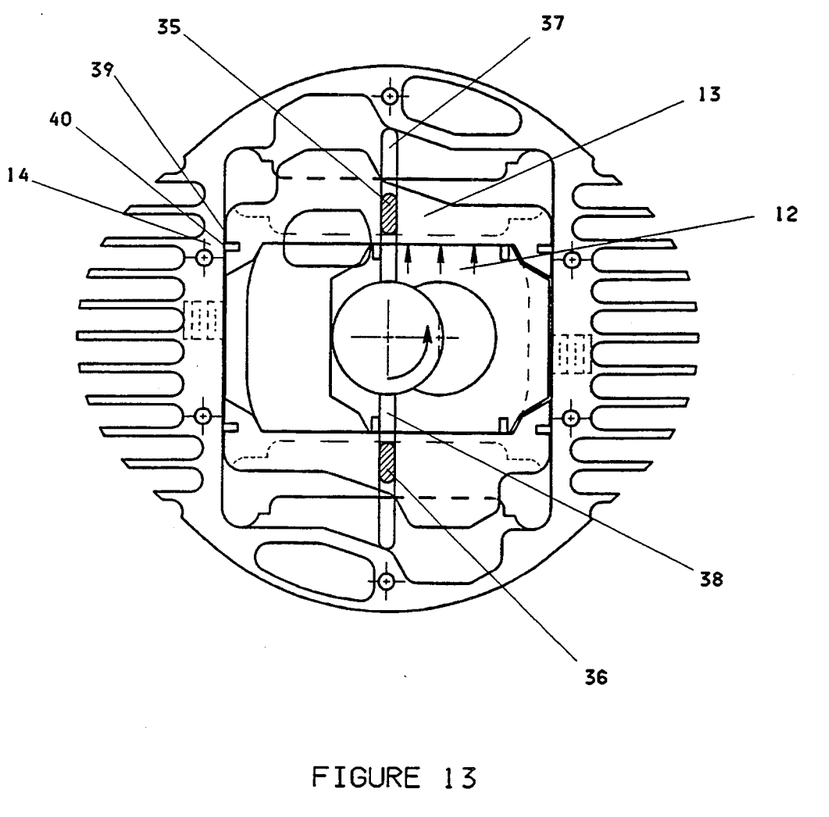
FIG. 13 is a view of the MCC engine mechanism utilizing a different means of providing directional sliding support for the combustion chamber member.

A fourth embodiment of this invention has a feature incorporated to reduce wear at critical locations and to consequently improve durability. This is accomplished by the elimination of the sliding contact between the ends of the CCM and the center power block sealing surface and the substitution and incorporation of sliding tabs to the center or the CCM adapted to slide back and forth inside slots located in the center of the front or rear, or both, of power block members 5. FIG. 13 illustrates a view of the internal mechanism utilizing one adaptation of this embodiment. In this arrangement the tabs 35 and 36 (denoted by crosshatching) are fixed to the upper and lower parts of the CCM 13 and provide the sole directional sliding support for the CCM as these tabs slide up and down in their respective slots 37 and 38 (located in the front and/or rear power block). Note in FIG. 13 that since all directional support for the CCM is provided by the center tab and slide arrangement that an intentional gap 39 is provided to keep the CCM from touching any part of the left and right combustion chamber surfaces of the center power block 14.

This unique embodiment provides two important advantages. First, the tabs and slots are located in a cooler location in which better lubrication quantity and control can be provided. This eliminates problems associated with borderline lubrication and wear due to the direct exposure to the heat of combustion. Second, working clearance between the tabs and slots can be held much closer than the clearance required between the CCM ends and the center power block surface. This feature assures the CCM's movement is wobble free. The sealing required to bridge gap 39 can be provided by simple strip seals 40 in which very little movement between the seal and its slot will be evident as the CCM is moving back and forth.

From the foregoing, it is now apparent that a novel engine mechanism and engine timing technique have been disclosed meeting the objects and advantageous features set out hereinbefore as well as others, and that numerous modifications as to the precise shapes, configurations and details may be made by those having ordinary skill in the art without departing from the spirit of the invention or the scope thereof as set out by the claims which follow.

What is claimed is:

1. In a self supercharged two stroke cycle internal combustion engine having a stationary power block housing, a combustion chamber member, a working piston, a crankshaft, and bearing means rotatably joining said crankshaft and said working piston, wherein the working piston is adapted to reciprocate inside and along a first axis relative to the combustion chamber member whereby two combustion chambers are formed with the working piston separating them, and wherein said combustion chamber member is adapted to reciprocate inside and relative to the stationary power block housing along a second axis substantially perpendicular to said first axis, whereby the working piston is guided through a circular motion by the crankshaft; and whereby the combustion chambers simultaneously change volume and position, the improvement comprising: a pair of non-symmetrical exhaust ports, one for each combustion chamber, and each comprising an aperture in the stationary power block housing located relative to the combustion chamber member and the working piston to be covered and closed off from the combustion chamber by motion of the combustion chamber member and subsequently uncovered and reconnected to the combustion chamber by motion of the working piston to thereby provide non-symmetrical exhaust port timing for the combustion chamber relative to its bottom dead center reference point in which the exhaust port opens at a larger angle before bottom dead center than the angle at which the exhaust port closes after bottom dead center.

2. The improvement of claim 1 wherein a pair of variable volume chambers are formed between the stationary power block housing and the combustion chamber member, said combustion chamber member separating said variable volume chambers and compressing each said variable volume chamber alternately during its sliding motion relative to said power block housing; and further comprising a pair of non-symmetrically timed inlet valves for supplying a fuel-air mixture to each of said variable volume chambers in which each valve opens a path between the corresponding variable volume chamber and an external fuel-air source when said variable volume chamber is past its top dead center position and said valve closes said path when said variable volume chamber is past its bottom dead center position.

3. The improvement of claim 2 further comprising a pair transfer ports each selectively interconnecting a variable volume chamber and a corresponding combustion chamber, each of said variable volume chambers expelling its fuel-air mixture into the corresponding combustion chamber by non-symmetrical port timing in which a transfer port is closed between the variable volume chamber and the corresponding combustion chamber after the combustion chamber exhaust port closes.

4. The improvement of claim 2 wherein the working piston has a pair of inlet ports and the crankshaft includes a hollow off-center eccentric portion having a slot therein, the slot being shared by the two inlet valves, the slot cooperating with and alternately communicating with the inlet ports in the working piston.

5. The improvement of claim 2 wherein each non symmetrically timed inlet valve comprises a partially hollow rotatable tubular member adapted to rotate in said stationary power block housing adjacent to its corresponding variable volume chamber, said valve providing timed porting by a slot in the rotatable tubular member communicating with an opening in said stationary power block as the valve is being rotated.

6. The improvement of claim 5 in which each of the inlet valves has a counter weight incorporated as an integral part of said tubular member, said members being driven in a one to one relationship with, but opposite in direction to, the main crankshaft.

7. The improvement of claim 1 further comprising means for providing an independent sliding support for the combustion chamber member, said sliding support means adapted to center the combustion chamber member to eliminate rubbing contact between the ends of the combustion chamber member and the stationary power block housing.

8. The improvement of claim 7 in which said sliding support means comprises tabs fixed to the center portion of the combustion chamber member, said tabs adapted to slide in slots which are centered in the engine and oriented to provide reciprocating motion to the combustion chamber member.

9. In a self supercharged two stroke cycle internal combustion engine having a stationary power block housing, a combustion chamber member, a working piston, a crankshaft, and bearing means rotatably joining said crankshaft and said working piston, wherein the working piston is adapted to reciprocate inside and along a first axis relative to the combustion chamber member whereby two combustion chambers are formed with the working piston separating them, and wherein a pair of variable volume chambers are formed between the power block housing and the combustion chamber member, said combustion chamber member separating said variable volume chambers and compressing each said variable volume chamber alternately during its sliding motion relative to said power block housing, said combustion chamber member being adapted to reciprocate inside and relative to the power block housing along a second axis substantially perpendicular to said first axis, whereby the working piston is guided through a circular motion by the crankshaft; and whereby the combustion chambers simultaneously change volume and position, the improvement comprising: a pair of non-symmetrically timed inlet valves for supplying a fuel-air mixture to each of said variable volume chambers in which each valve opens a path between the corresponding variable volume chamber and an external fuel-air source when said variable volume chamber is past its top dead center position and said valve closes said path when said variable volume chamber is past its bottom dead center position.

10. The improvement of claim 9 further comprising a pair of non-symmetrical exhaust ports, one for each combustion chamber, and each comprising an aperture in the stationary power block housing located relative to the combustion chamber member and the working piston to be covered and closed off from the combustion chamber by motion of the combustion chamber member and subsequently uncovered and reconnected to the combustion chamber by motion of the working piston to thereby provide non-symmetrical exhaust port timing for the combustion chamber relative to its bottom dead center reference point in which the exhaust port opens at a larger angle before bottom dead center than the angle at which the exhaust port closes after bottom dead center.

11. The improvement of claim 9 further comprising means for providing an independent sliding support for the combustion chamber member, said sliding support means adapted to the center the combustion chamber member to eliminate rubbing contact between the ends of the combustion chamber member and the stationary power block housing.

12. The improvement of claim 11 in which said sliding support means comprises tabs fixed to the center portion of the combustion chamber member, said tabs adapted to slide in slots which are centered in the engine and oriented to provide reciprocating motion to the combustion chamber member.

13. In a self supercharged two stroke cycle internal combustion engine having a stationary power block housing, a combustion chamber member, a working piston, a crankshaft, and bearing means rotatably joining said crankshaft and said working piston, wherein the working piston is adapted to reciprocate inside and along a first axis relative to the combustion chamber member whereby two combustion chambers are formed with the working piston separating them, and wherein said combustion chamber member is adapted to reciprocate inside and relative to the stationary power block housing along a second axis substantially perpendicular to said first axis, whereby the working piston is guided through a circular motion by the crankshaft; and whereby the combustion chambers simultaneously change volume and position, the improvement comprising: at least a pair of fuel injectors, one for each combustion chamber, each incorporated into the stationary power block housing adjacent to its corresponding combustion chamber, each fuel injector located in said stationary power block housing at a position in which the normal movement of said combustion chamber member will provide a cover to protect the injector from the heat and pressure of combustion during the time that ignition, combustion and expansion is occurring.

14. The improvement of claim 13 further comprising a pair of non-symmetrical exhaust ports, one for each combustion chamber, and each comprising an aperture in the stationary power block housing located relative to the combustion chamber member and the working piston to be covered and closed off from the combustion chamber by motion of the combustion chamber member and subsequently uncovered and reconnected to the combustion chamber by motion of the working piston to thereby provide non-symmetrical exhaust port timing for the combustion chamber relative to its bottom dead center reference point in which the exhaust port opens at a larger angle before bottom dead center than the angle at which the exhaust port closes after bottom dead center.

15. The improvement of claim 14 wherein a pair of variable volume chambers are formed between the stationary power block housing and the combustion chamber member, said combustion chamber member separating said variable volume chambers and compressing each said variable volume chamber alternately during its sliding motion relative to said stationary power block housing; and further comprising a pair of non-symmetrically timed inlet valves for supplying combustion air to each of said variable volume chambers in which each valve opens a path between the corresponding variable volume chamber and an external combustion air source when the said variable volume chamber is past its top dead center position and said valve closes said path when said variable volume chamber is past its bottom dead center position.

16. The improvement of claim 15 further comprising a pair of transfer ports each selectively interconnecting a variable volume chamber and a corresponding combustion chamber, each of said variable volume chambers expelling its combustion air into the corresponding combustion chamber by non-symmetrical port timing in which a transfer port is closed between the variable volume chamber and the corresponding combustion chamber after the combustion chamber exhaust port closes.

17. The improvement of claim 15 wherein the working piston has a pair of inlet ports and the crankshaft includes a hollow off-center eccentric portion having a slot therein, the slot being shared by the two inlet valves, the slot cooperating with and alternately communicating with the inlet ports in the working piston.

18. The improvement of claim 15 wherein each non-symmetrically timed inlet valve comprises a partially hollow rotatable tubular member adapted to rotate in said stationary power block housing adjacent to its corresponding variable volume chamber, said valve providing timed porting by a slot in the rotatable tubular member communicating with an opening in said stationary power block as the valve is being rotated.

19. In a self supercharged two stroke cycle internal combustion engine having a stationary power block housing, a combustion chamber member, a working piston, a crankshaft, and bearing means rotatably joining said crankshaft and said working piston, wherein the working piston is adapted to reciprocate inside and along a first axis relative to the combustion chamber member whereby two combustion chambers are formed with the working piston separating them, and wherein said combustion chamber member is adapted to reciprocate inside and relative to the stationary power block housing along a second axis substantially perpendicular to said first axis, whereby the working piston is guided through a circular motion by the crankshaft; and whereby the combustion chambers simultaneously change volume and position, the improvement comprising: means for providing an independent sliding support fop the combustion chamber member, said sliding support means adapted to center the combustion chamber member to eliminate rubbing contact between the ends of the combustion chamber member and the stationary power block housing.

20. The improvement of claim 19 in which said sliding support means comprises tabs fixed to the center portion of the combustion chamber member, said tabs adapted to slide in slots which are centered in the engine and oriented to provide reciprocating motion to the combustion chamber member.

* * * * *